United States Patent [19]
Simmons

[11] Patent Number: 5,932,939
[45] Date of Patent: Aug. 3, 1999

[54] ELECTRICAL SERVICE DISCONNECT BOXES FOR CONVEYING POWER TO ADJACENT ELECTRICAL APPLIANCES SUCH AS AIR CONDITIONERS

[75] Inventor: Michael L. Simmons, Sarasota, Fla.

[73] Assignees: Jeffrey S. Houk; Dominick J. Gibino, both of Manassas, Va.; part interest to each

[21] Appl. No.: 09/120,281

[22] Filed: Jul. 22, 1998

[51] Int. Cl.⁶ .................................................. H03K 5/153
[52] U.S. Cl. ........................................... 307/326; 361/641
[58] Field of Search .................................. 307/326, 328, 307/38, 80, 85; 361/641–648

[56] References Cited

U.S. PATENT DOCUMENTS

| | | | |
|---|---|---|---|
| 4,266,266 | 5/1981 | Sanner | 361/357 |
| 5,315,475 | 5/1994 | Scheidel et al. | 361/643 |
| 5,574,612 | 11/1996 | Pak | 361/93 |
| 5,627,724 | 5/1997 | Leach et al. | 361/663 |
| 5,784,249 | 7/1998 | Pouliot | 361/622 |

*Primary Examiner*—Jeffrey Gaffin
*Assistant Examiner*—Ed Garlepp
*Attorney, Agent, or Firm*—Laurence R. Brown

[57] ABSTRACT

This invention provides a device which facilitates electrical wiring and equipment costs for electricians installing disconnect boxes, typically in the vicinity of an outside air conditioner unit. Thus, an improved disconnect box for protection of an electrician who is servicing an electrical appliance such as an outside air conditioner is provided which incorporates an integrally mounted auxiliary electric socket accessory giving the electrician a source of power for use while the electrician is safely assured that there is no power connected to the electrical appliance being serviced. The auxiliary electrical socket accessory may optionally be connected to a power line source as a full time electric plug outlet or one only accessible when the disconnect box is conditioned to disconnect power from the electrical appliance. Provisions are made for protection of the electrical socket accessory with fusing or circuit breaker protection and ground fault protected electrical input wiring to the electrical socket. The disconnect box is preferably weatherproofed for outside use to serve as a common housing for waterproofing the electrical socket. By provision of the improved disconnect box, the electrician can more efficiently install an auxiliary access socket for use of the electrician when the electrical appliance is disconnected either in retrofit or initial installations.

6 Claims, 3 Drawing Sheets

TO AIR CONDITIONER

ELECTRICAL SERVICE DISCONNECT BOXES FOR CONVEYING POWER TO ADJACENT ELECTRICAL APPLIANCES SUCH AS AIR CONDITIONERS

TECHNICAL FIELD

This invention relates to electrical wiring accessories, and more particularly it relates to electrical service disconnect boxes having disconnect switches, such plug blocks manually pulled by an attending electrician, for interrupting power conveyed to electrical appliances, such as air conditioners, when being serviced.

BACKGROUND ART

The installation of auxiliary electrical plugs in a location facilitating use of an electrician during servicing an electrical appliance, typically an outside air conditioner unit, either in an initial installation or a retrofit installation, takes considerable electrician time and equipment cost. Thus, it is required to conveniently locate the auxiliary electrical plug accessory, to install a weatherproof housing upon a masonry wall, or the like, and to make interacting electrical connections such as installation of new ground fault protected wiring lines to the plug accessory.

There is not any off-the-shelf electrical accessory currently available to aid the electrician in this special task.

Accordingly it is an objective of this invention to resolve the prior art problem and to reduce the electrician's time and equipment costs in a manner that the electrician is conveniently provided with an electrical plug accessory that is safe, simpler to install and consistent with applicable electrical wiring code requirements.

DISCLOSURE OF THE INVENTION

This invention incorporates a service plug accessory for the electrician's use while servicing a disconnected electrical appliance, such as an outside air conditioner installation, into an improved service disconnect box. This resolves the problem of installing a separate outside weatherproofed service plug in a convenient location adjacent the electrical appliance where the service disconnect box is located.

For initial installations the step of preparing a site, and interconnecting wiring from the service plug to the service disconnect box are eliminated to facilitate installation at lower cost of both electrician's time and the equipment necessary for provision of a service plug for the electrician to use when servicing the air conditioner.

Similarly for retrofit installations the step of preparing a site and interconnecting the wiring is eliminated when the improved service disconnect box of this invention is available to replace the initially installed block with less electrician time and labor, which is a significant part of the installation cost.

Thus, the improved service disconnect box has integrally mounted and wired therein the service plug accessory which the electrician may use when the air conditioner is disconnected from the source of electrical power, typically by manual removal of a plug by the servicing electrician when a cover access door is opened.

The plug accessory in the service disconnect box can be configured and wired into service in several optional embodiments. One preferred embodiment has a ground fault electric service wiring connection from a power line source through a circuit protected by a breaker or fuse, typically of 15 or 20 ampere capacity, which connection is isolated from the incoming electrical power lines for powering the electrical appliance load, namely an air conditioner, or the like.

Another embodiment has the auxiliary service plug wired from the incoming electrical power lines for powering the electrical appliance load, already provided for in routine prior art service disconnect boxes. This internal service disconnect box wiring optionally has either a full time live wired plug circuit connection or a plug circuit connection wired through a switch actuatued only when the disconnect plug is removed and there is no power available in the electrical appliance such as an air conditioner.

Furthermore the auxiliary electrical plug circuit available for the electrician's use may be structurally mounted within the service disconnect box with access only when an access door is opened for the purpose of removing the disconnect link or block to disconnect the air conditioner. Alternatively the auxiliary electrical serviceman's plug may be mounted upon the box in a configuration protecting the plug for outside weather, but electrically connected whether or not the disconnect link is removed to remove electrical power from the electrical utility device.

Other features, advantages and objectives of the invention will be found throughout the following specification, drawings and claims.

BRIEF DESCRIPTION OF THE DRAWINGS

In the accompanying drawings, in which like reference characters represent similar features throughout the various views.

THE PREFERRED EMBODIMENTS

Figure 1:
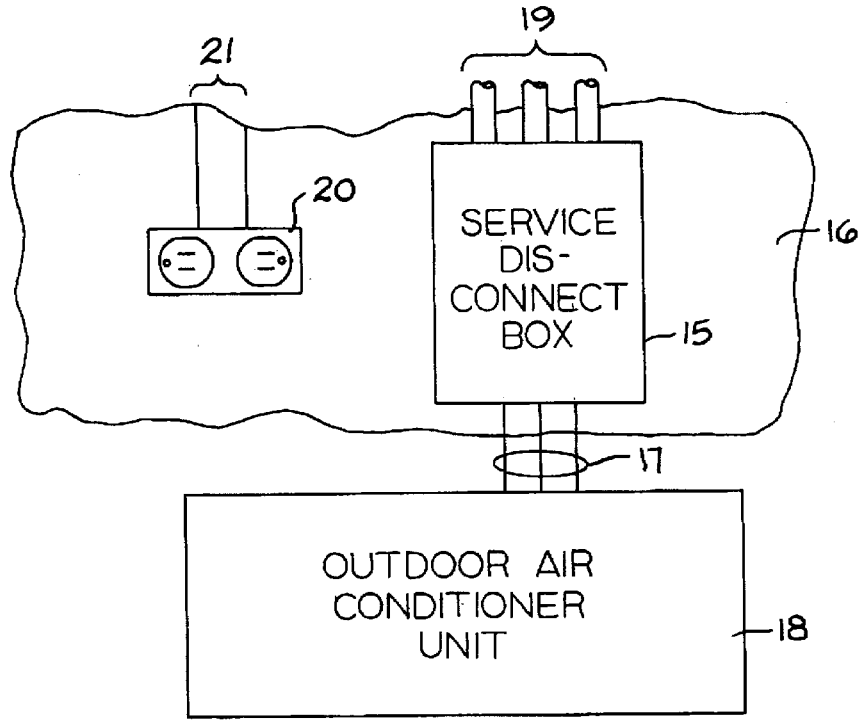
FIG. 1 is a block diagram representation of a state of the prior art configuration of a service disconnect system for an air conditioner unit with an associated electrical service outlet for use by a electrician at the air conditioner site.

Now with reference to the accompanying drawings, the state of the prior art disconnect box systems is seen from FIG. 1. The service disconnect box 15 is mounted upon a building wall 16, typically masonry, to provide a safety disconnect link assuring that the electrical power from lines 17 to the air conditioner unit 18 is off when the electrician needs to service that unit. Thus the box 15 and the input appliance power lines 19 from a suitable source such as properly ground fault protected lines from a breaker or fuse box inside the building, are appropriately affixed to the wall 16 in accordance with the requirements of local electrical wiring codes.

Since the disconnect box 15 isolates the air conditioner unit 18 from the possibility of having any live power lines therein, there is no electrical ac source of power for the servicing electrician to use in the servicing process to power instruments, tools, flashlights and the like. Thus, the electrician either needs to install on the wall 16 an electrical service socket outlet 20 in a convenient location for access when servicing the air conditioner unit 18, or to run a cable from some existing outside weather protected electrical service socket, or through a window, etc. from an inside-the-building electrical socket.

The cost of installing the electrical service socket outlet 20 is high. Typically, in a brick wall 16, a mounting site must be prepared, possibly by a mason, and the incoming wires 20 must be connected from a remote fuse or breaker center, and the electrical outlet must be of the weatherproofed nature to withstand outdoor environment. Those problems are resolved by this invention, which as will later become evident facilitates the installation and reduces the equipment cost for supplying local electric service sockets at the air conditioner site for use of an electrician servicing the air conditioner.

Figure 2:
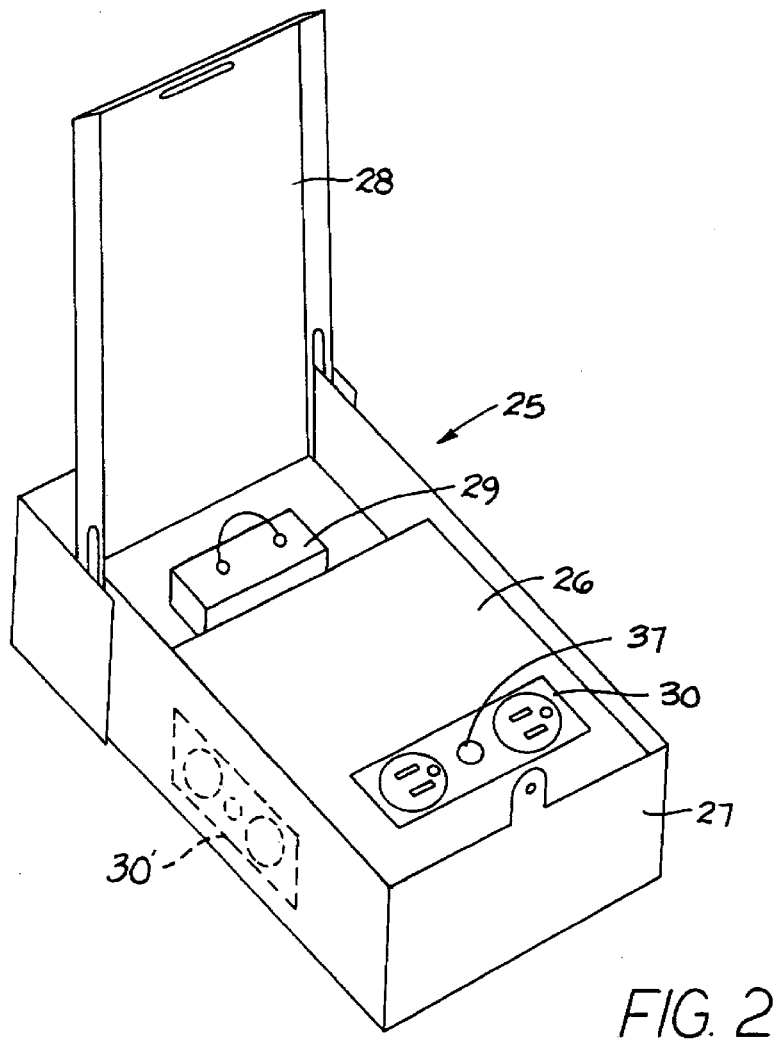
FIG. 2 is an embodiment of this invention displaying a service disconnect box for an electrical appliance, typically an air conditioner, providing for use of an electrician servicing the electrical appliance an electrical outlet service plug structurally mounted for use when the access cover is opened.
Figure 3:
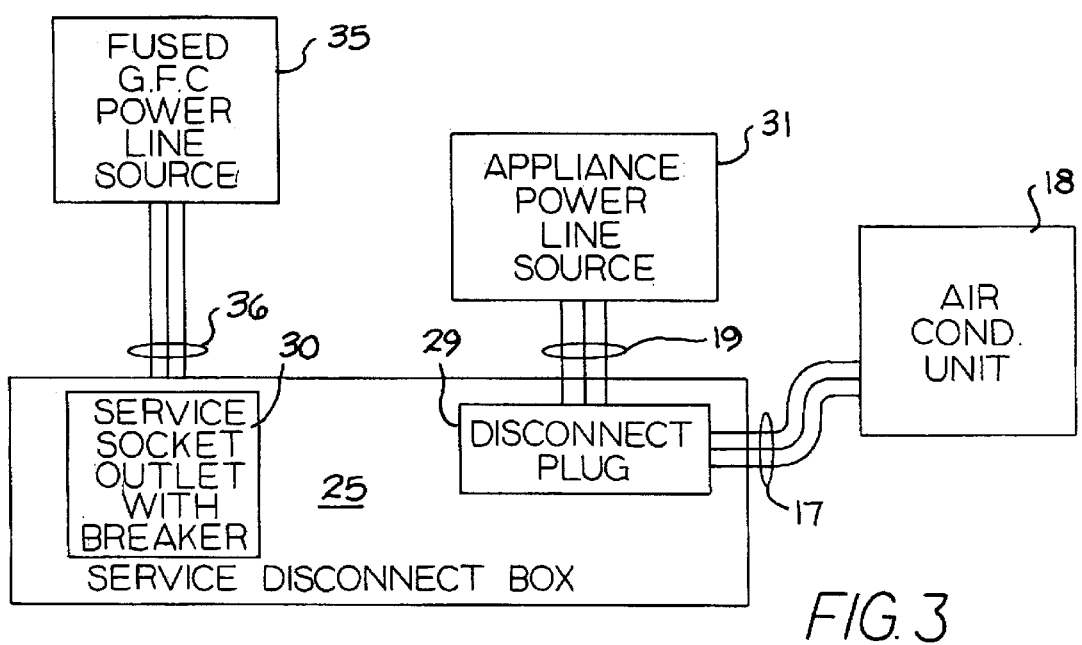
FIG. 3 is a block circuit diagram of an electrical wiring embodiment afforded by this invention providing isolated incoming electrical wiring to the electrical outlet service plug.

Now with reference to the structure of the service disconnect box 25 in FIG. 2 and the block electric circuit diagram of the service disconnect box wiring system of the FIG. 3 embodiment, the improvements of the disconnect box structure and electrical circuitry afforded by this invention are set forth.

The improved electric service disconnect box for disconnecting electric power from an adjacent electrical appliance has structurally mounted thereon the electrical service output socket accessory mounted optionally either as internally mounted electrical socket 30, or externally mounted socket 30'.

When the electrical socket accessory 30 is mounted, for example upon an internal panel 26 accessible inside the weatherproof housing 27 suitable for outdoor locations when the protective access cover 28 is manually opened and the typical disconnect plug 29 is removed to assure that there are no live power connections to the air conditioning unit 18. In this installation, the socket accessory 30 need not of itself be adapted to withstand the outside weather environment.

The disadvantage of this internal configuration (30) of the electrical socket accessory, is that it cannot be used for any other use than as a service socket for repair of the air conditioner unit 18. Thus, the external configuration (30') provides the electrical socket accessory as a weatherproofed configuration located on an outer wall 31 of the service disconnect box 25, where it is available at all times for uses such as with electrical lawn trimmers, or the like.

The internally disposed electrical circuit conduit means for conveying current from the appliance power line source 31 through incoming electrical supply wires 19 to output wires 17 in the embodiment of FIG. 3 need not be modified, when the isolated power ground fault connected power line source 35 is connected into the service disconnect box 25 as shown at 36. Note that preferably the electrical service socket accessory 30 is supplied with a local circuit breaker, reset by button 37. This isolated power line source 35 then becomes available for handling the power requirements of any servicing equipment used by the electrician during repairs and inspection of the air conditioner unit 18, without addition of current carrying capacity of the appliance power line source to handle surplus power above the peak load necessary to start an air conditioner compressor for example.

Figure 4:
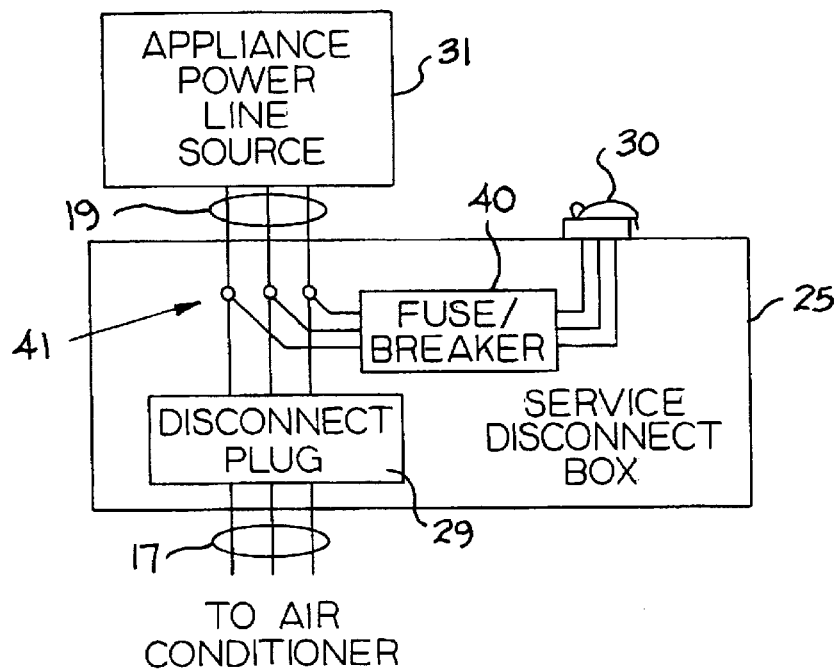
FIG. 4 is a block diagram of the electrical circuits and service disconnect box structure of an alternative embodiment of the invention wherein a full service weatherproofed electric service plug is positioned on the outer surface of the service disconnect box for general use.

In the FIG. 4 embodiment, the service socket accessory is mounted on the outside of the service disconnect box 25 cabinet walls, and is protected by a conventional weatherproofing cap for outside use. Either inside the service disconnect box or in the socket 30' assembly structure is mounted a fuse or breaker unit 40 for fusing protection of the service outlet socket.

By way of bosses or wire connector terminals 41, the incoming power lines 19 are branched to provide electrical connections within the disconnect box 25 to connect electrical wiring to power the electric socket accessory 30' from said incoming electrical wiring 19 for powering the air conditioner, or other electrical appliance.

One significant advantage of this embodiment is that to retrofit a service outlet socket 30 at an air conditioner site outside a building, for example, it may be quite inconvenient and expensive to find an installation site for an outside weatherproof socket accessory. This FIG. 4 service disconnect box 25 as a unit therefore could be substituted for a conventional prior art type of disconnect box 15 (FIG. 1) with very little wiring and site preparation labor involved, thereby making it simpler to upgrade existing locations.

Figure 5:
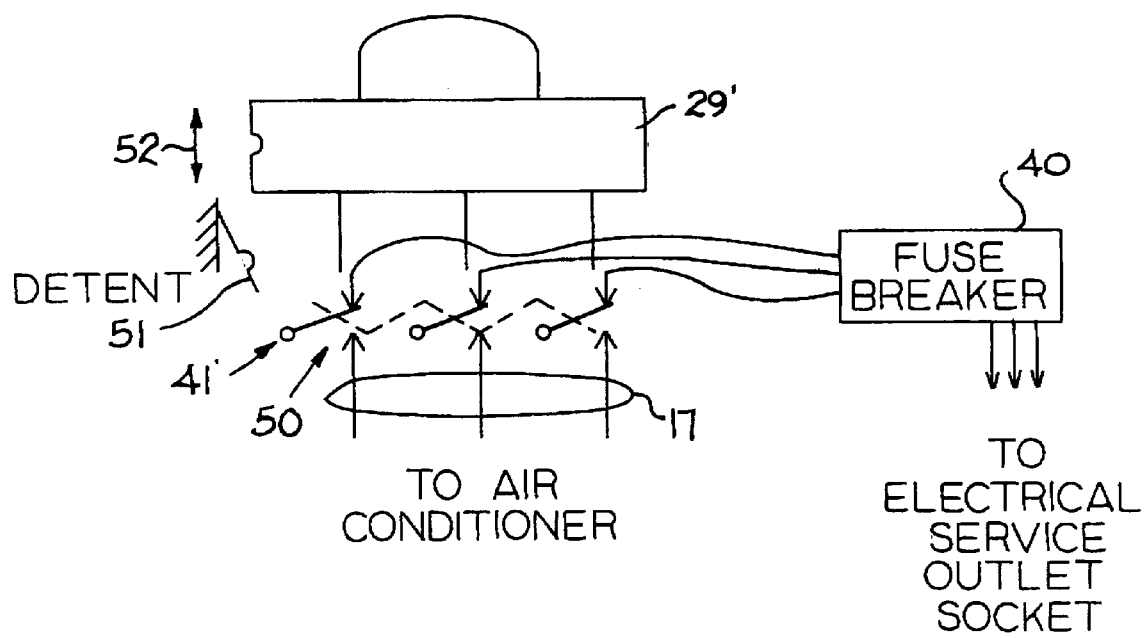
FIG. 5 is a fragmental drawing of a disconnect plug circuit afforded by a further embodiment of this invention to connect the service plug outlet by wiring within the disconnect box to the power line source for an air conditioner appliance.

In the fragmental view of the disconnect plug variation 29' of FIG. 5, a further embodiment of the invention is seen that comprises an electrical three ganged, double throw switch 50 is connected in said electrical connections between the incoming electrical wiring for said electrical appliance and the electrical plug accessory at the aforesaid terminals 41', for example, thereby to connect electrical power to said electrical plug accessory only when the manual disconnect means is operable to disconnect power from the electrical appliance. The detent spring 51, or equivalent friction mount, holds the disconnect plug 29' normally in its stable downward position noted by arrowheads 52 to connect terminals 41' to the air conditioner for normal operation thereof.

Conversely in the safety position, as shown, with the disconnect plug 29' pulled, the switch 50 is spring biassed to normally return to the uppermost position shown to connect the electrical power to the electrical service socket outlet accessory. Thus, the electrical service outlet can only be used to withdraw current from the appliance power line source (31) when the air conditioner is out of service.

It is evident therefore from the foregoing specification that this invention has improved the state of the art. Accordingly those features of novelty believed representative of the spirit and nature of the invention are defined with particularity in the following claims.

I claim:

1. In a weather protected electric service disconnect box for outside use with a protective access cover and internally disposed electrical circuit conduit means for conveying current from incoming electrical supply wires to output wires for powering an adjacent electrical appliance and further comprising manual disconnect means for manually disconnecting the internal electrical circuit for ascertaining that power cannot be connected to the electrical appliance while being serviced, the improvement comprising in combination:

said incoming electrical supply wires comprising ground fault protected wiring lines, an electrical socket accessory connected to said ground fault protected wiring lines internally disposed in said disconnect box and mounted stably upon the disconnect box for use of an electrician servicing the electrical appliance, to thereby afford an on-site electric service outlet for said service appliance at the disconnect box, and circuit breaker means connected with and located upon said electrical socket accessory to fuse output power available from the electrical socket accessory.

2. In a weather protected electric service disconnect box for outside use with a protective access cover and internally disposed electrical circuit conduit means for conveying current from incoming electrical supply wires to output wires for powering an adjacent electrical appliance and further comprising manual disconnect means for manually disconnecting the internal electrical circuit for ascertaining that Power cannot be connected to the electrical appliance while being serviced, the improvement comprising in combination:

said incoming electrical supply wires comprising around fault protected wiring lines, an electrical socket accessory connected to said around fault protected wiring lines internally disposed in said disconnect box and mounted stably upon the disconnect box for use of an electrician servicing the electrical appliance, to thereby afford an on-site electric service outlet for said service appliance at the disconnect box, and electrical connections within the disconnect box to connect electrical wiring to power the electrical socket accessory from said incoming electrical wiring for said electrical appliance.

3. The improvement of claim 2 further comprising an electrical switch connected in said electrical connections between the incoming electrical wiring for said electrical appliance and the electrical socket accessory to connect electrical power to said electrical socket accessory only when the manual disconnect means is operable to disconnect power from the electrical appliance.

4. An improved weather protected electric service disconnect box for use in an outside atmosphere to disconnect electric power from an adjacent electrical appliance when servicing that appliance, comprising in combination:

a weatherproof housing for outdoor locations having a protective access cover manually accessible for internal access, around fault connected internally disposed electrical circuit conduit means for conveying current from incoming electrical supply wires to output wires for powering a separately located electrical appliance, manual disconnect means for manually disconnecting the internal electrical circuit for ascertaining that power cannot be connected to the electrical appliance while being serviced, an electrical socket accessory mounted stably upon the disconnect box for use of an electrician servicing the electrical appliance and connected to said around fault connected incoming power lines by wiring internally disposed in said disconnect box, and circuit breaker means connected with and located on said electrical socket accessory to fuse output power available from the electrical socket accessory.

5. An improved weather protected electric service disconnect box for use in an outside atmosphere to disconnect electric power from an adjacent electrical appliance when servicing that appliance, comprising in combination:

a weatherproof housing for outdoor locations having a protective access cover manually accessible for internal access, ground fault connected internally disposed electrical circuit conduit means for conveying current from incoming electrical supply wires to output wires for powering a separately located electrical appliance, manual disconnect means for manually disconnecting the internal electrical circuit for ascertaining that power cannot be connected to the electrical appliance while being serviced, an electrical socket accessory mounted stably upon the disconnect box for on-site use of an electrician servicing the electrical appliance and connected to said ground fault connected incoming power lines by wiring internally disposed in said disconnect box, and electrical connections within the disconnect box to connect electrical wiring to power the electrical socket accessory from said incoming wiring for said electrical appliance.

6. The disconnect box of claim 5 further comprising an electrical switch connected in said electrical connections between the incoming electrical wiring for said electrical appliance and the electrical socket accessory to connect electrical power to said electrical socket accessory only when the manual disconnect means is operable to disconnect power from the electrical appliance.

* * * * *